(12) United States Patent
Otsuka

(10) Patent No.: US 12,306,406 B2
(45) Date of Patent: May 20, 2025

(54) IMAGE PROCESSING METHOD, IMAGE PROCESSING APPARATUS, AND HEAD-MOUNTED DISPLAY

(71) Applicant: Sony Interactive Entertainment Inc., Tokyo (JP)

(72) Inventor: Katsushi Otsuka, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/121,292

(22) Filed: Mar. 14, 2023

(65) Prior Publication Data

US 2023/0236425 A1 Jul. 27, 2023

Related U.S. Application Data

(63) Continuation of application No. 16/823,781, filed on Mar. 19, 2020, now Pat. No. 11,640,058.

(30) Foreign Application Priority Data

Mar. 29, 2019 (JP) ................. 2019-068186

(51) Int. Cl.
*G02B 27/01* (2006.01)

(52) U.S. Cl.
CPC .... *G02B 27/0172* (2013.01); *G02B 2027/011* (2013.01); *G02B 2027/0116* (2013.01); *G02B 2027/0138* (2013.01); *G02B 2027/014* (2013.01); *G02B 2027/0178* (2013.01)

(58) Field of Classification Search
CPC .... H04N 5/232; H04N 5/247; G02B 27/0172; G02B 2027/011; G02B 2027/0116; G02B 2027/0138; G02B 2027/014; G02B 2027/0178

See application file for complete search history.

(56) References Cited

U.S. PATENT DOCUMENTS

| | | |
|---|---|---|
| 10,902,820 B2 | 1/2021 | Peng et al. |
| 2006/0061601 A1 | 3/2006 | Iga et al. |
| 2011/0141318 A1 | 6/2011 | Lee et al. |
| 2014/0218567 A1 | 8/2014 | Han |
| 2014/0340287 A1 | 11/2014 | Achilefu et al. |

(Continued)

FOREIGN PATENT DOCUMENTS

| | | |
|---|---|---|
| JP | 2006-085021 A | 6/2006 |
| JP | 2010-279063 A | 12/2010 |

(Continued)

OTHER PUBLICATIONS

United States Office Action dated Dec. 1, 2021, from related U.S. Appl. No. 16/823,781.

(Continued)

*Primary Examiner* — Michael A Faragalla
(74) *Attorney, Agent, or Firm* — XSENSUS, LLP

(57) ABSTRACT

Disclosed herein is an image processing method executed by an image processing apparatus. The image processing method includes designating a distribution of pixels whose charge is to be added and read out from among pixels an image sensor has, and acquiring data of a captured image in which an area of a region that is a unit from which charge is to be read out differs depending upon a position by the designation.

10 Claims, 13 Drawing Sheets

(56) References Cited

U.S. PATENT DOCUMENTS

| | | | | |
|---|---|---|---|---|
| 2016/0080645 A1* | 3/2016 | Ohba | ................... | H04N 13/156 |
| | | | | 348/207.11 |
| 2018/0188190 A1* | 7/2018 | Durko | .............. | G01N 23/20075 |
| 2018/0315156 A1* | 11/2018 | Shin | .......................... | G06T 1/20 |
| 2019/0220411 A1* | 7/2019 | Nellutla | ................ | G06F 9/5016 |

FOREIGN PATENT DOCUMENTS

| | | |
|---|---|---|
| JP | 2011-129902 A | 6/2011 |
| JP | 2015-070476 A | 4/2015 |
| JP | 2016-063537 A | 4/2016 |
| JP | 2018-019191 A | 2/2018 |
| WO | 2013/125138 A1 | 8/2013 |
| WO | 2013/140697 A1 | 9/2013 |

OTHER PUBLICATIONS

United States Office Action dated Aug. 4, 2022, from related U.S. Appl. No. 16/823,781.

United States Notice of Allowance dated Dec. 14, 2022, from related U.S. Appl. No. 16/823,781.

Japanese Office Action dated Jan. 31, 2023 for the Corresponding Japanese Patent Application No. 2019-068186.

\* cited by examiner

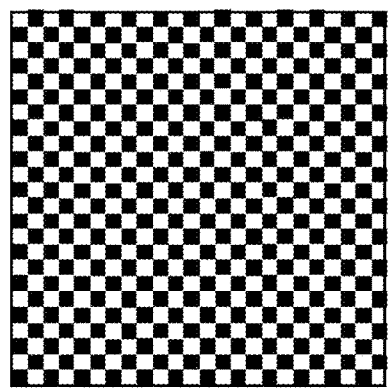
F I G . 5 C
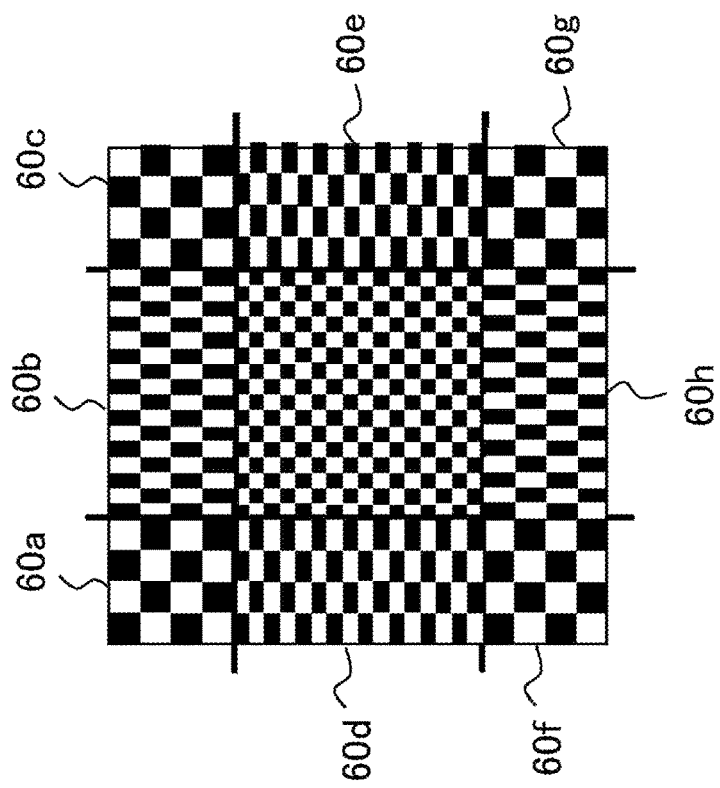
F I G . 5 B
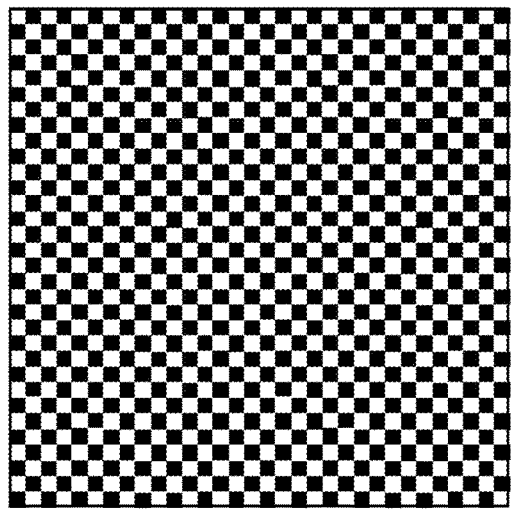
F I G . 5 A

IMAGE PROCESSING METHOD, IMAGE PROCESSING APPARATUS, AND HEAD-MOUNTED DISPLAY

CROSS REFERENCE TO RELATED APPLICATIONS

This application claims the benefit of Japanese Priority Patent Application JP 2019-068186 filed Mar. 29, 2019, the entire contents of which are incorporated herein by reference.

BACKGROUND

The present disclosure relates to an image processing method and an image processing apparatus for processing a captured image and a head-mounted display for displaying a captured image.

A technology for capturing a moving picture and processing the captured moving picture on a real time basis to acquire some information or use a result of the processing for displaying is utilized in various fields. For example, if a camera for imaging an actual space is provided on a front face of a shielded type head-mounted display and a captured image by the camera is displayed as it is, then a user can make an action while confirming a surrounding situation. Further, if a virtual object is displayed in an overlapping relation with a captured image, then augmented reality (AR) or mixed reality (MR) can be implemented.

Also, a technology is commonly utilized by which an image captured by a monitoring camera or an on-vehicle camera is analyzed to recognize an imaged person or article or detect a motion of the imaged person or article. Also, a technology is available by which a captured image is transmitted and displayed in real time to and at a different place such as a management room or is displayed after it is recorded. In a case where an image having a wide angle of view is acquired using a fisheye camera, also a process for converting the acquired image having a wide angle of view into an image of a format suitable for analysis or displaying is performed. In this manner, various kinds of processes to be performed for a captured image are performed depending upon the use.

SUMMARY

In such modes as described above, while quality of an image upon displaying can be enhanced by increasing a performance of a camera and enhancing quality of a captured image, a data amount to be transmitted from capturing to displaying and a load of various processes such as image analysis increase. As a result, power consumption, a memory capacity to be used, and a consumption amount of resources such as central processing unit (CPU) time increase, and a period of time that is too long to be ignored may be required for display or analysis.

The present disclosure has been made in view of such a subject as described above, and it is desirable to provide a technology that can reduce, in display or various processes that use a captured image, a consumption amount of resources while suppressing an influence on a result.

According to an embodiment of the present disclosure, there is provided an image processing method executed by an image processing apparatus. The image processing method includes designating a distribution of pixels whose charge is to be added and read out from among pixels an image sensor has, and acquiring data of a captured image in which an area of a region that is a unit from which charge is to be read out differs depending upon a position by the designation.

According to another embodiment of the present disclosure, there is provided an image processing apparatus including an image analysis section configured to designate a distribution of pixels whose charge is to be added and read out from among pixels an image sensor has, and a signal processing section configured to acquire data of a captured image in which an area of a region that is a unit from which charge is to be read out differs depending upon a position by the designation.

According to a further embodiment of the present disclosure, there is provided a head-mounted display including an image processing apparatus, an image sensor, and a display panel. The image processing apparatus includes an image analysis section configured to designate a distribution of pixels whose charge is to be added and read out from among pixels the image sensor has, and a signal processing section configured to acquire data of a captured image in which an area of a region that is a unit from which charge is to be read out differs depending upon a position by the designation. The image sensor supplies a captured image to the signal processing section. The display panel displays an image generated by the image processing apparatus using the captured image.

It is to be noted that also an arbitrary combination of the constituent elements described above and conversions of representations of the embodiments of the present disclosure between a method, an apparatus, a system, a computer program, a data structure, a recording medium, and so forth are effective as modes of the present disclosure.

According to the embodiments of the present disclosure, in display or various processes that use a captured image, the consumption amount of resources can be reduced while the influence on a result is suppressed.

The above and other objects, features and advantages of the present disclosure will become apparent from the following description and the appended claims, taken in conjunction with the accompanying drawings in which like parts or elements are denoted by like reference symbols.

BRIEF DESCRIPTION OF THE DRAWINGS

FIGS. 5A to 5C are views illustrating examples of a mode of binning of a captured image in the present embodiment;

DETAILED DESCRIPTION OF THE PREFERRED EMBODIMENT

The purpose of use of an embodiment of the present disclosure is not specifically limited if the technology sets a captured image as a processing target such as display, analysis, recording, or transfer, and also the form of a camera or the mode of display may vary in response to the purpose. In the following description, as a representative example, a head-mounted display including a camera is described mainly.

Figure 1:
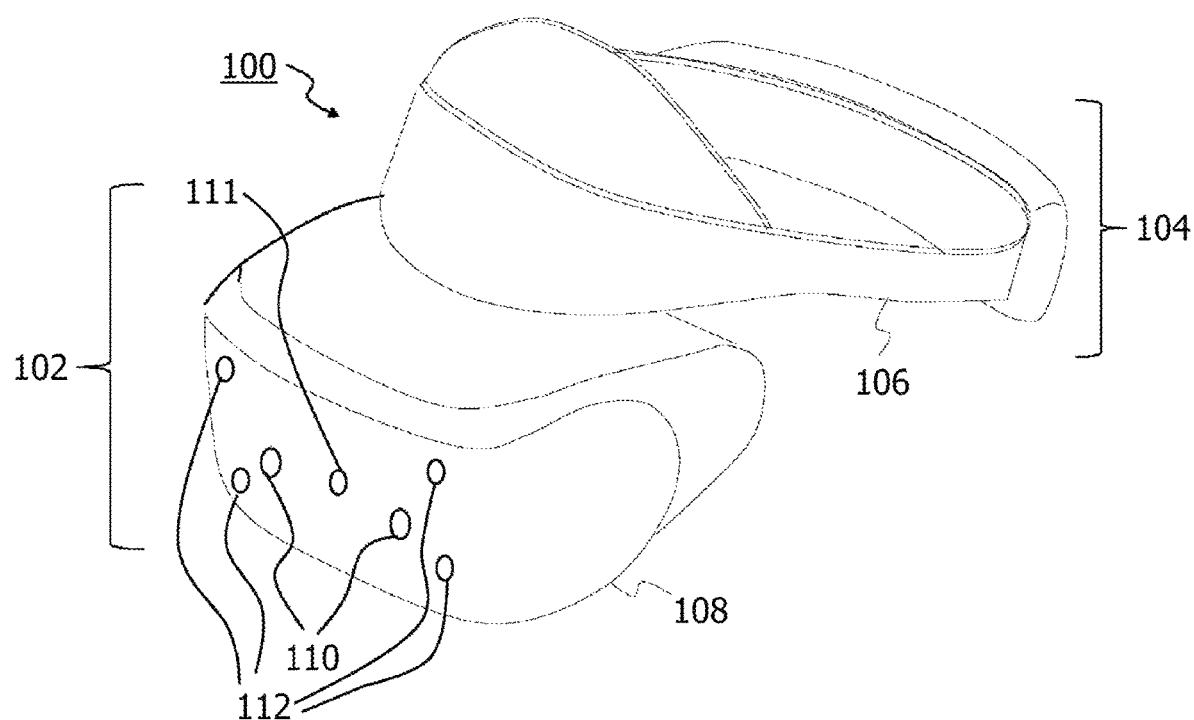
FIG. 1 is a view depicting an example of an appearance of a head-mounted display of an embodiment of the present disclosure.

FIG. 1 depicts an example of an appearance of a head-mounted display 100. In the present example, the head-mounted display 100 includes an outputting mechanism section 102 and a mounting mechanism section 104. The mounting mechanism section 104 includes a mounting band 106 that goes, when the mounting mechanism section 104 is worn by a user, around the head of the user to implement fixation of the head-mounted display 100. The outputting mechanism section 102 includes a housing 108 shaped such that it covers the left and right eyes of the user in a state in which the user wears the head-mounted display 100 and includes, in the inside of the housing 108, a display panel that faces the eyes of the user when the head-mounted display 100 is worn by the user.

The housing 108 may further include, in the inside thereof, eyepieces that are positioned between the display panel and the eyes of the user when the head-mounted display 100 is worn and enlarges an image to be viewed by the user. The head-mounted display 100 may further include speakers or earphones at positions corresponding to the ears of the user when the head-mounted display 100 is worn. Further, the head-mounted display 100 may have built-in motion sensors such that a translational motion or a rotational motion, and eventually a position or a posture at each time of the head of the user wearing the head-mounted display 100 are detected.

The head-mounted display 100 further includes a stereo camera 110 on a front face of the housing 108, a monocular camera 111 of a wide viewing angle at a middle portion of the front face, and four cameras 112 of a wide viewing angle at four left upper, right upper, left lower, and right lower corners of the front face. The head-mounted display 100 captures a moving picture of an actual space in a direction corresponding to an orientation of the face of the user. For example, a mode can be provided in which an image captured by the stereo camera 110 is displayed immediately such that a manner of the actual space in a direction in which the user is directed is displayed as it is. Such a mode as just described is hereinafter referred to as "see-through mode."

Within a period within which an image of content is not displayed, the head-mounted display 100 automatically transits to and takes the see-through mode, and therefore, before starting, after ending, or upon interruption of content, or in a like case, the user can confirm a surrounding situation without removing the head-mounted display 100. The transition timing to the see-through mode may otherwise be a timing when the user explicitly performs a transition operation or the like. This makes it possible for the user to perform desired operation such as temporary switching, even during appreciation of content, of the display to that of an image of the actual space at an arbitrary timing and finding and picking up a controller.

At least one of captured images by the stereo camera 110, the monocular camera 111, and the four cameras 112 can be utilized also as an image of content. For example, if a virtual object is synthesized with the captured image in such a position, a posture, and a motion as those corresponding to the reflected actual space and displayed with the captured image, then AR or MR can be implemented. In this manner, a position, a posture, and a motion of an object to be drawn can be determined using a result of analysis of a captured image irrespective of whether or not the captured image is to be included in the display.

For example, stereo matching may be performed for the captured image to extract corresponding points such that a distance to an imaging target is acquired in accordance with the principle of triangulation. As an alternative, the position or the posture of the head-mounted display 100 and eventually of the head of the user with respect to a surrounding space may be acquired by simultaneous localization and mapping (SLAM). Also, object recognition, object depth measurement, and so forth can be performed. By these processes, a virtual world can be drawn and displayed in a field of vision corresponding to the position of a visual point or a gaze direction of the user.

It is to be noted that, as described above, the apparatus that captures an image in the present embodiment is not limited to a camera provided on the head-mounted display 100 and may be a fixed point camera whose field of vision does not vary, a handy camera or a portable terminal that is grasped by a person and whose field of vision is changed, or a camera provided on a moving object such as a vehicle. Further, the apparatus is not limited to a stereo camera and may be a monocular camera or a multi-view camera having three or more lenses. Also, the apparatus that displays a captured image is not limited to a head-mounted display and may be a general display apparatus such as an installation type display, a portable display, or a projector.

Figure 2:
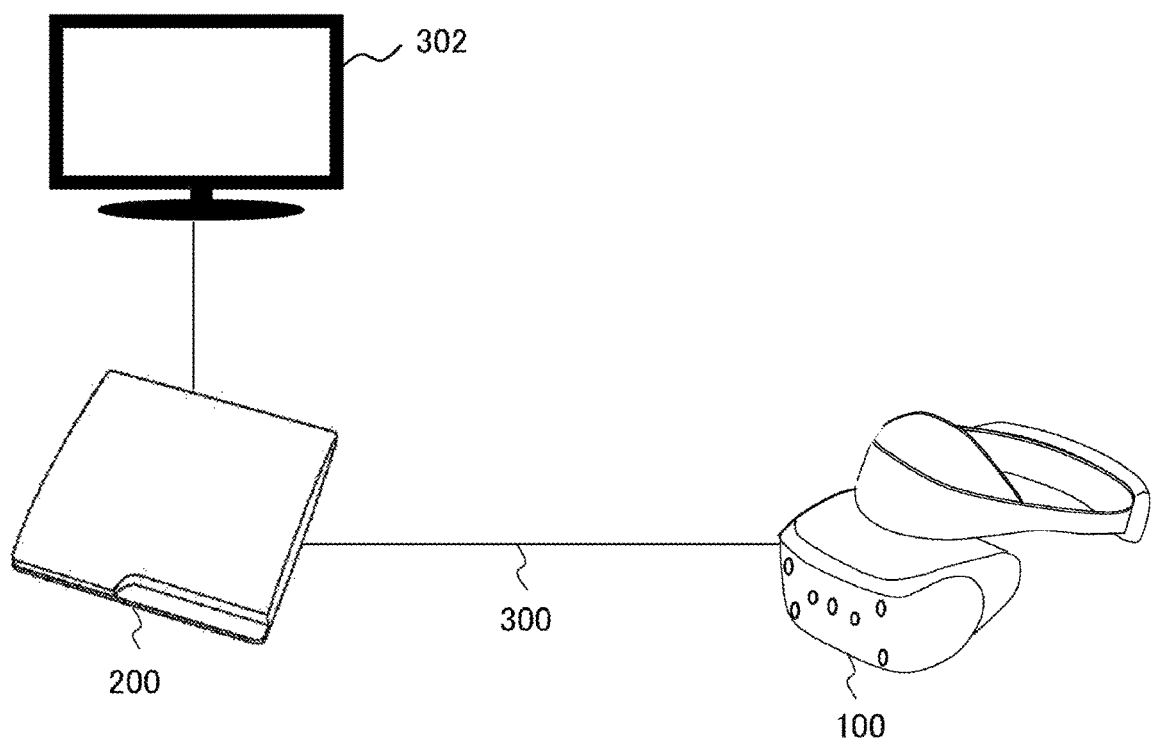
FIG. 2 is a view depicting an example of a configuration of a content processing system of the present embodiment.

FIG. 2 depicts an example of a configuration of a content processing system according to the present embodiment. The head-mounted display 100 is connected to a content processing apparatus 200 by an interface 300 for wireless communication or for connecting a peripheral apparatus such as universal serial bus (USB) Type-C. A flat panel display 302 is connected to the content processing apparatus 200. The content processing apparatus 200 may be further connected to a server through a network. In this case, the server may provide the content processing apparatus 200 with an online application such as a game in which a plurality of users can participate through the network.

Basically, the content processing apparatus 200 processes a program of content and generates a display image and transmits it to the head-mounted display 100 or the flat panel display 302. In a certain mode, the content processing apparatus 200 specifies a position of a visual point or a direction of the gaze of a user who wears the head-mounted display 100 on the basis of the position and the posture of the head of the user and generates a display image of a corresponding field of vision at a predetermined rate.

The head-mounted display 100 receives data of the display image and displays the data as an image of the content. Here, a purpose of displaying an image is not restricted specifically. For example, the content processing apparatus 200 may generate a virtual world, which is a stage of a game, as a display image while an electronic game is being progressed or may display a still image or a moving image for the purpose of appreciation or information provision irrespective of whether the image indicates a virtual world or an actual world.

Figure 3:
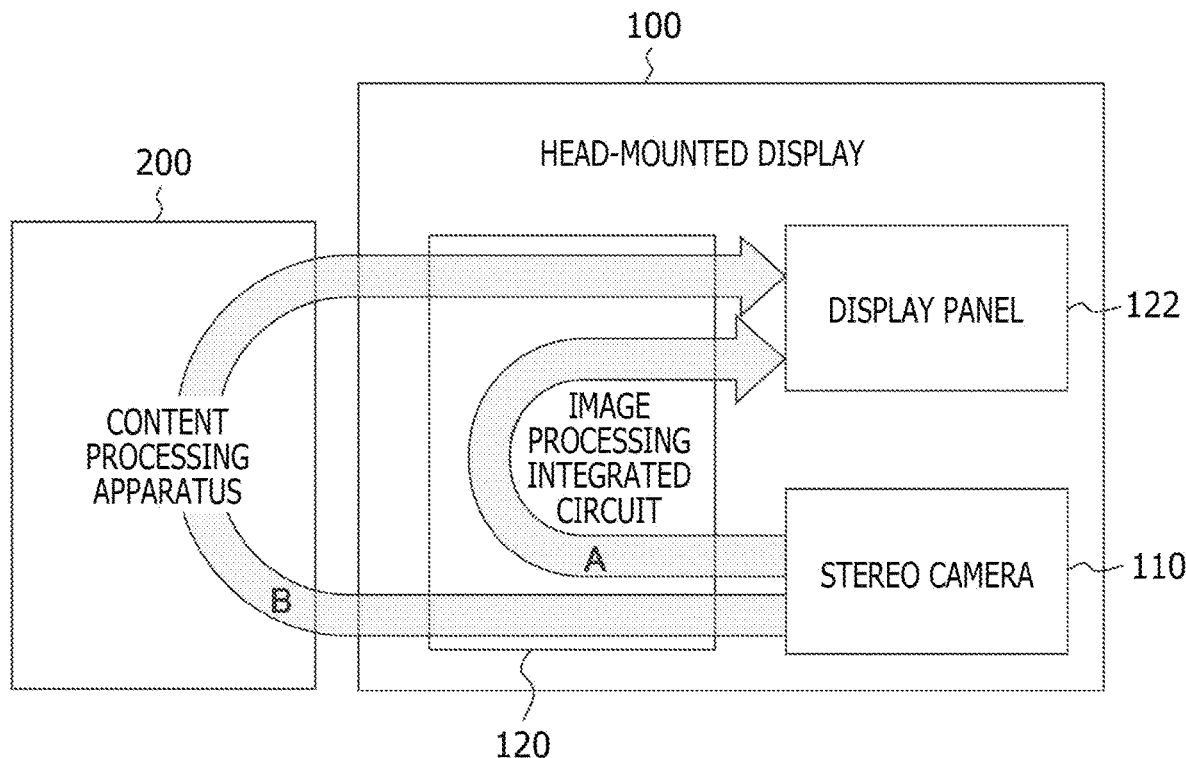
FIG. 3 is a view schematically depicting a path of data in the content processing system.

FIG. 3 schematically depicts a path of data in the content processing system of the present embodiment. The head-mounted display 100 includes the stereo camera 110 and a display panel 122 as described hereinabove. However, the camera is not limited to the stereo camera 110 as described above but may be any one or a combination of the monocular camera 111 and the four cameras 112. This similarly applies also to the following description. The display panel 122 is a panel having a general displaying mechanism such as a liquid crystal display or an organic electroluminescence (EL) display and displays an image in front of the eyes of the user who wears the head-mounted display 100. Further, the head-mounted display 100 includes an image processing integrated circuit 120 in the inside thereof.

The image processing integrated circuit 120 is, for example, a system-on-chip in which various function modules including a CPU are incorporated. It is to be noted that, although the head-mounted display 100 further includes such motion sensors as a gyro sensor, an acceleration sensor, and an angular acceleration sensor, a main memory such as a dynamic random access memory (DRAM), an audio circuit for generating sound to be heard by the user, a peripheral apparatus interface for connecting a peripheral apparatus, and so forth, illustration of them is omitted.

In order to implement AR or MR with a head-mounted display of the shielded type, generally a captured image by the stereo camera 110 or the like is fetched into a main constituent that processes content and is synthesized with a virtual object by the main constituent to generate a display image. In the system depicted, since the main constituent that processes content is the content processing apparatus 200, an image captured by the stereo camera 110 is transmitted once into the content processing apparatus 200 via the image processing integrated circuit 120 as indicated by an arrow mark B.

The transmitted captured image is synthesized with a virtual object and so forth and then returned to the head-mounted display 100, where it is displayed on the display panel 122. On the other hand, in the present embodiment, the see-through mode is established and a path for data different from the path for processing of content is provided. In particular, as indicated by an arrow mark A, an image captured by the stereo camera 110 is suitably processed by the image processing integrated circuit 120 and then displayed as it is on the display panel 122. At this time, the image processing integrated circuit 120 carries out only a process for correcting the captured image to a format suitable for displaying.

According to the path of the arrow mark A, since the data transmission path is short significantly in comparison with that of the arrow mark B, the period of time after capturing of an image till displaying can be reduced and the power consumption related to transmission can be reduced. Further, in the present embodiment, the correction process by the image processing integrated circuit 120 is carried out in parallel to imaging without waiting for imaging for one frame by the stereo camera 110 and resulting data are sequentially outputted to the display panel 122.

With the configuration described above, a captured image corresponding to the orientation of the face of the user can be displayed immediately, and a state similar to that where the surroundings are viewed without the intervention of a display can be generated. It is to be noted that the path of the arrow mark A can be used not only in the see-through mode but also when an image generated by the content processing apparatus 200 and a captured image are synthesized. In particular, only data of an image to be synthesized is transmitted from the content processing apparatus 200 and is synthesized with a captured image by the image processing integrated circuit 120 of the head-mounted display 100 and then outputted to the display panel 122.

It is to be noted that, in a case where the content processing apparatus 200 uses information relating to the actual space acquired by analyzing the captured image to generate the image to be synthesized, the content processing apparatus 200 may transmit following pieces of information along with the image to be synthesized: information indicating the information relating to the actual space acquired by analyzing the captured image at what point of time is used, information indicating when the synthesis is to be performed, and information indicating a permissible delay time of the synthesis. This enables the image processing integrated circuit 120 and the content processing apparatus 200 to appropriately control the timing to perform the synthesis with the captured image.

Figure 4:
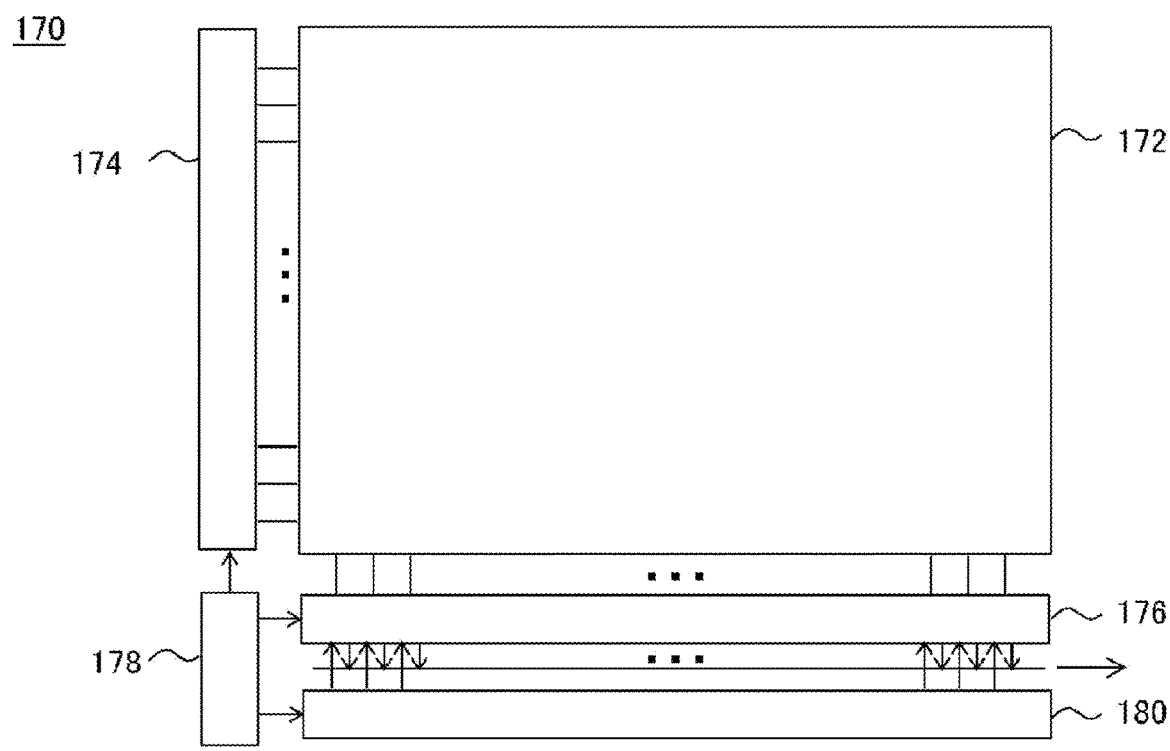
FIG. 4 is a view depicting an overview of a structure of an image sensor incorporated in a stereo camera of the present embodiment.

FIG. 4 schematically depicts a structure of an image sensor incorporated in the stereo camera 110. The image sensor 170 includes a pixel section 172, and a row scanning section 174, a horizontal selection section 176, a column scanning section 180, and a control section 178 as peripheral circuits. The pixel section 172 is configured by arraying imaging devices for performing photoelectric conversion of incident light in a matrix. Each pixel includes an existing mechanism such as a transistor for reading out charge generated by the photoelectric conversion and accumulated in a charge accumulation layer and is coupled to the row scanning section 174 for each row and to the horizontal selection section 176 and the column scanning section 180 for each column. The row scanning section 174 includes a shift register and an address code and drives the pixels in a unit of a row.

A signal outputted from a pixel selectively scanned by the row scanning section 174 is supplied to the horizontal selection section 176. The horizontal selection section 176 includes amplifiers, horizontal selection switches, and so forth. The column scanning section 180 includes a shift register, an address decoder, or the like and drives pixel reading circuits connected to the respective horizontal selection switches of the horizontal selection section 176 in order while operating the horizontal selection switches. Signals from the pixels supplied to the horizontal selection section 176 are outputted to the outside by the selective scanning by the column scanning section 180. The control section 178 generates timing signals and controls driving timings of the horizontal selection section 176 and the column scanning section 180.

The image sensor 170 of the present embodiment has the control section 178 control the driving timing of each scanning line so as to be capable of varying an area and an aspect ratio of a "pixel" as a charge readout unit. In particular, charge accumulated by a plurality of imaging devices neighboring with each other is added and read out taking, as a minimum unit, imaging devices arrayed in the pixel section 172 and having areas equal to each other. Then, by outputting an average value as a pixel value, a region including the plurality of imaging devices is determined as one pixel region. A method for reading out charge of a plurality of imaging devices neighboring with each other together by the image sensor is generally called "binning."

In the present embodiment, by changing a mode of binning depending upon a region on an image, a data amount can be reduced and an image having an appropriate resolution can be easily generated in response to a use while reducing power consumption of the row scanning section 174, the horizontal selection section 176, the column scanning section 180, and an interface for connecting the image sensor and the image processing integrated circuit.

FIGS. 5A to 5C are views illustrating examples of the mode of binning of a captured image in the present embodiment. FIGS. 5A to 5C individually indicate an array of pixels, and pixels neighboring with each other are distinguished by white and black for easy recognition. FIG. 5A indicates an array of pixels in a case where binning is not performed. In particular, within an entire region on an image plane depicted in FIG. 5A, the area and the shape (aspect ratio) of a region represented by one pixel are the same.

FIG. 5B indicates an array of pixels in a case where a region for which binning is to be performed is provided at part of an image plane. In particular, a region for which binning is to be performed is provided in regions 60a to 60h near to a peripheral edge of the image plane. Consequently, an information amount can be maintained within a central region and quality degradation is less likely to be recognized even if the data is used for display.

In a case where a person gazes at one point, a range viewed in a high resolution is called discrimination visual field and is a small angular range of approximately 5° from a gazing point. An effective visual field that can be viewed comparatively well only by eye movement is in a range of 30° in a horizontal direction and 20° in a vertical direction on outer sides of the angular range. Since the eyesight of a person significantly degrades toward the outer sides of the range, for example, even if the resolution in a predetermined region on an inner side of the peripheral edge is decreased by binning from within an image displayed on the head-mounted display 100, the decrease of the resolution is less likely to be recognized.

Further, the number of pixels incorporated in the pixel section 172 of the image sensor 170 is determined generally on the basis of a resolution that may be required for a captured image. In the case of a fisheye lens, an imaging target is projected to the pixel section 172 in a state in which it is condensed most at a peripheral edge portion thereof at which a distortion rate is high. Therefore, the number of pixels used for achieving a required resolution for the entire captured image when a fisheye lens is used is determined in accordance with the number of pixels allocated per unit imaging area at a peripheral edge portion at which the distortion rate is high. In this case, at a central portion at which the distortion rate is low, the number of pixels allocated per unit imaging area is excessive with respect to the required resolution.

Accordingly, in the case of a captured image captured using a fisheye lens, even if the resolution at the central portion at which the lens distortion rate is low is decreased by binning, the decrease of the resolution is less likely to be recognized. On the other hand, in the case of a wide angle lens, an imaging target is projected to the pixel section 172 in a state in which it is extended most at a peripheral edge portion at which the distortion rate is high. Accordingly, in the case of a captured image captured using a wide angle lens, even if the resolution in a peripheral edge portion region in which the lens distortion rate is high is decreased, the decrease of the resolution is less likely to be recognized. In this manner, taking various situations into consideration, a region with regard to which decrease of the resolution is less likely to be recognized is determined as a binning target.

Further, by changing the unit of imaging devices from which charge is to be read out all at once, the area and the aspect ratio of a region represented by one pixel after binning are changed depending upon the position on the image plane. In the example of FIG. 5B, in regions 60a, 60c, 60f, and 60g at four corners of the image plane, 2×2 pixels are combined into one pixel. Further, in regions 60b and 60h at an upper end and a lower end of the image plane, 1×2 pixels are combined into one pixel and, in regions 60d and 60e at a left end and a right end, 2×1 pixels are combined into one pixel. It is to be noted that representation of the number of pixels is "the number of pixels in the horizontal direction×the number of pixels in the vertical direction." This similarly applies to the following description.

By variably setting a unit of pixels to be combined in this manner, partial binning can be implemented by easy control. For example, it can be considered that, in a case where pixels in two rows are combined, charge read out in the first low is stored into a register not depicted and, when charge in the second row is read out, the value in the register is added. It can be considered that, in a case where pixels in two columns are combined, charge is individually read out when the row is scanned and added together.

By appropriately combining such processes as described above, a pixel value can be added in various units and also a region for which binning is not to be performed can be easily provided. Further, it can be recognized by those skilled in the art that various methods are available for binning in an image sensor. However, in the present embodiment, by dividing the added pixel value by the number of pixels of an addition target, data of a captured image in which pixel values can be handled equivalently irrespective of the region even if areas of pixels are different is acquired.

The control section 178 of the image sensor 170 controls timings for storage and readout of charge on the basis of such setting of distribution of pixels of an addition target as depicted in FIG. 5B. Here, the distribution of pixels of an addition target may be variable. For example, in a case where a captured image is to be displayed, a gazing point detector for detecting a position on a screen gazed at by the user may be provided on the head-mounted display 100, and a region spaced by a predetermined value or more from the gazing point may be made a binning target.

In such a case as just described, the image processing integrated circuit 120 or the content processing apparatus 200 may designate distribution of pixels of an addition target for the control section 178 of the image sensor 170. At this time, the control section 178 of the image sensor 170 stores information relating to the designation into a register not depicted. It is to be noted that, in a case where the distribution of pixels of an addition target is fixed, the area of an imaging device itself may be diversified as depicted in FIG. 5B such that the area and the aspect ratio of a pixel are physically diversified.

FIG. 5C depicts an array of pixels on data to be outputted from the image sensor by such partial binning as depicted in FIG. 5B. In particular, as a result when a plurality of pixels are combined by binning and treated as one pixel, data of a captured image as an enumeration of pixel values is reduced from that in the case of FIG. 5A in which binning is not performed. In other words, the image sensor represents, in data of the captured image, a region represented by a plurality of pixels neighboring with each other with one pixel value thereby to reduce the number of pixels, and thereby generates an image that is different from a display image and in which the region area represented by one pixel is equal. This can reduce the size of data that is a target of transmission and processing.

Figure 6B:
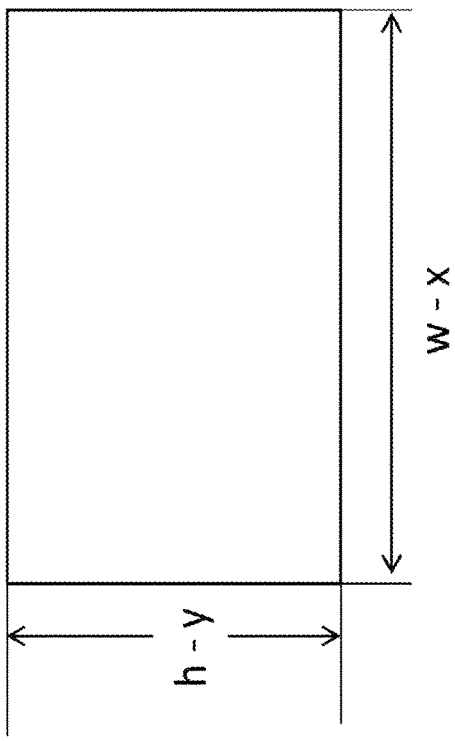
FIGS. 6A and 6B are views illustrating a reduction amount of a data size by partial binning in the present embodiment.
Figure 6A:
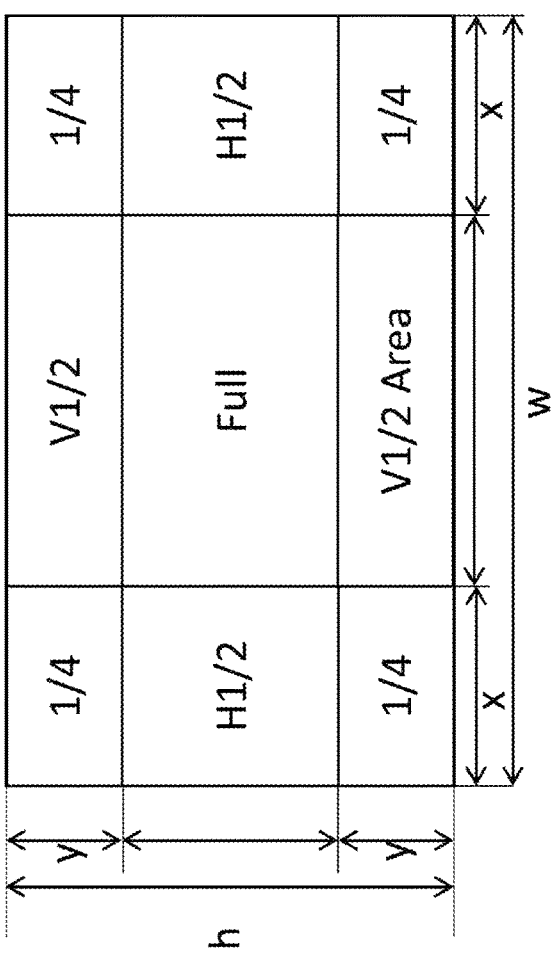

FIGS. 6A and 6B are views illustrating a reduction amount of a data size by partial binning. FIG. 6A depicts the number of pixels before binning and FIG. 6B depicts the number of pixels after binning both in terms of area. As depicted in FIG. 6A, the number of pixels, namely, the number of imaging devices, before binning is w×h. A region including at least one of a region having a width of the number x of pixels at the left end and the right end and a region having a width of the number y of pixels at the upper end and the lower end is determined as a binning target.

Further, as depicted in FIGS. 5A to 5C, in the regions at the four corners, the number of pixels is reduced in both of the vertical and horizontal directions to ½ (represented as "¼"), and in the regions at the upper end and the lower end, the number of pixels is reduced in the vertical direction to ½ (represented as "V½") while, in the regions at the left end and the right end, the number of pixels is reduced in the horizontal direction to ½ (represented as "H½"). Consequently, the number of pixels after binning is (w−x)×(h−y) as depicted in FIG. 6B. By carrying out such reduction of data as described above in all frames of a captured moving picture, the bitrate to be used can be suppressed significantly. This effect becomes more remarkable as the frame rate increases.

Figure 7A:
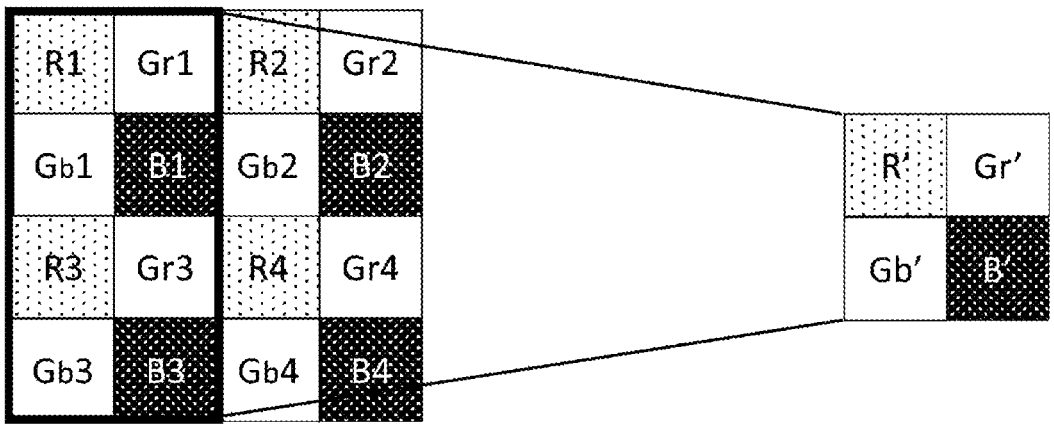
FIGS. 7A to 7C are views illustrating examples of arithmetic operation of a binning process in the present embodiment.
Figure 7B:
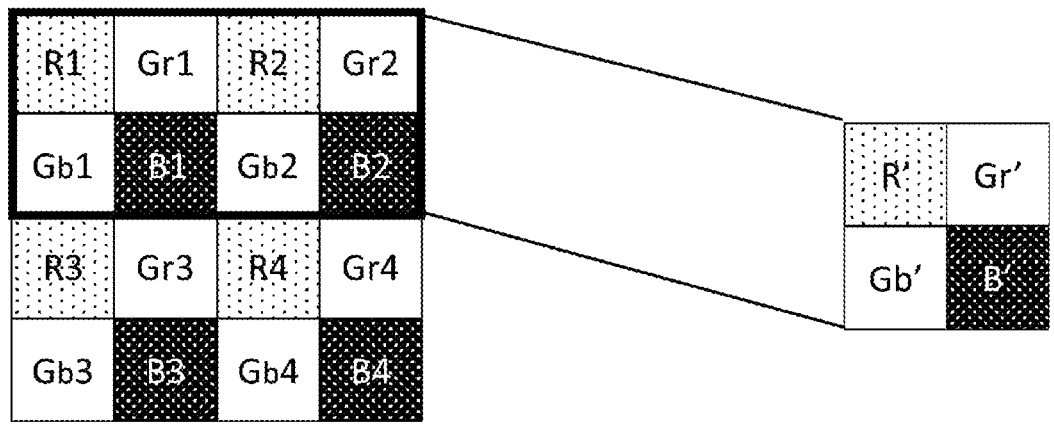
Figure 7C:
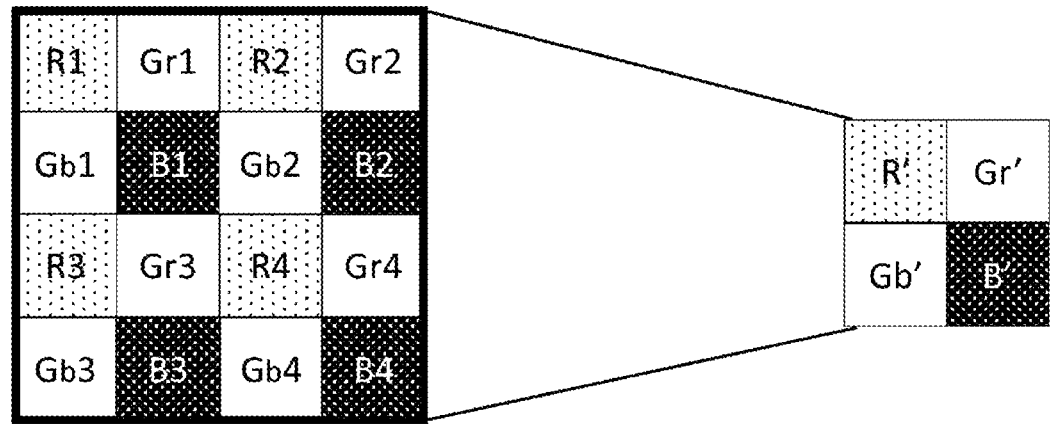

FIGS. 7A to 7C are views illustrating examples of arithmetic operation of a binning process. Generally, since an imaging device detects light transmitted through a filter of one of three primary colors of red, green, and blue as charge, the array of pixels depicted in FIGS. 5A to 5C actually has an array of predetermined colors. In a Bayer array that is a general color array, two pixels on a diagonal line from among four pixels of 2×2 are green pixels, and the two remaining pixels are a red pixel and a blue pixel.

Accordingly, upon binning, it may be necessary to combine discrete pixels representing a same color. For example, in a case where ½ reduction in the vertical direction is to be performed as depicted in FIG. 7A, 2×4 pixels are reduced as one set as indicated by a thick line. Then, values (R1 and R3, Gr1 and Gr3, Gb1 and Gb3, and B1 and B3) of pixels of same colors arranged in every other pixel in the vertical direction are averaged to determine values of 2×2 pixels after binning. In particular, values of red R', green Gr', green Gb', and blue B' after binning are calculated in the following manner.

$R'=(R1+R3)/2$ $Gr'=(Gr1+Gr3)/2$ $Gb'=(Gb1+Gb3)/2$ $B'=(B1+B3)/2$

In a case where ½ reduction in the horizontal direction is to be performed as depicted in FIG. 7B, 4×2 pixels are reduced as one set as indicated by a thick line. Then, values (R1 and R2, Gr1 and Gr2, Gb1 and Gb2, and B1 and B2) of pixels of same colors arranged in every other pixel in the horizontal direction are averaged to determine values of 2×2 pixels after binning. In particular, values of red R', green Gr', green Gb', and blue B' after binning are calculated in the following manner.

$R'=(R1+R2)/2$ $Gr'=(Gr1+Gr2)/2$ $Gb'=(Gb1+Gb2)/2$ $B'=(B1+B2)/2$

In a case where ½ reduction in both of the vertical and horizontal directions is to be performed as depicted in FIG. 7C, 4×4 pixels are reduced as one set as indicated by a thick line. Then, values of pixels of same colors arranged in every other pixel in both of the vertical and horizontal directions are averaged to determine values of 2×2 pixels after binning. In particular, values of red R', green Gr', green Gb', and blue B' after binning are calculated in the following manner.

$R'=(R1+R2+R3+R4)/4$ $Gr'=(Gr1+Gr2+Gr3+Gr4)/4$ $Gb'=(Gb1+Gb2+Gb3+Gb4)/4$ $B'=(B1+B2+B3+B4)/4$

In the present embodiment, data of a captured image partly binned in this manner is acquired and a different process is performed in response to a use. In particular, in a case where data of a captured image is used for display, a pixel density of a region that is made a binning target is returned to an original one. In a case where data of a captured image is used for image analysis or compression encoded, pseudo binning is carried out further such that the pixel density is adjusted to that of a most reduced region. Consequently, for a visual stimulus to a person with high spatial resolution, an information amount is maintained while, in image analysis or compression encoding, the load of processing is reduced by a minimum required resolution.

Figure 8:
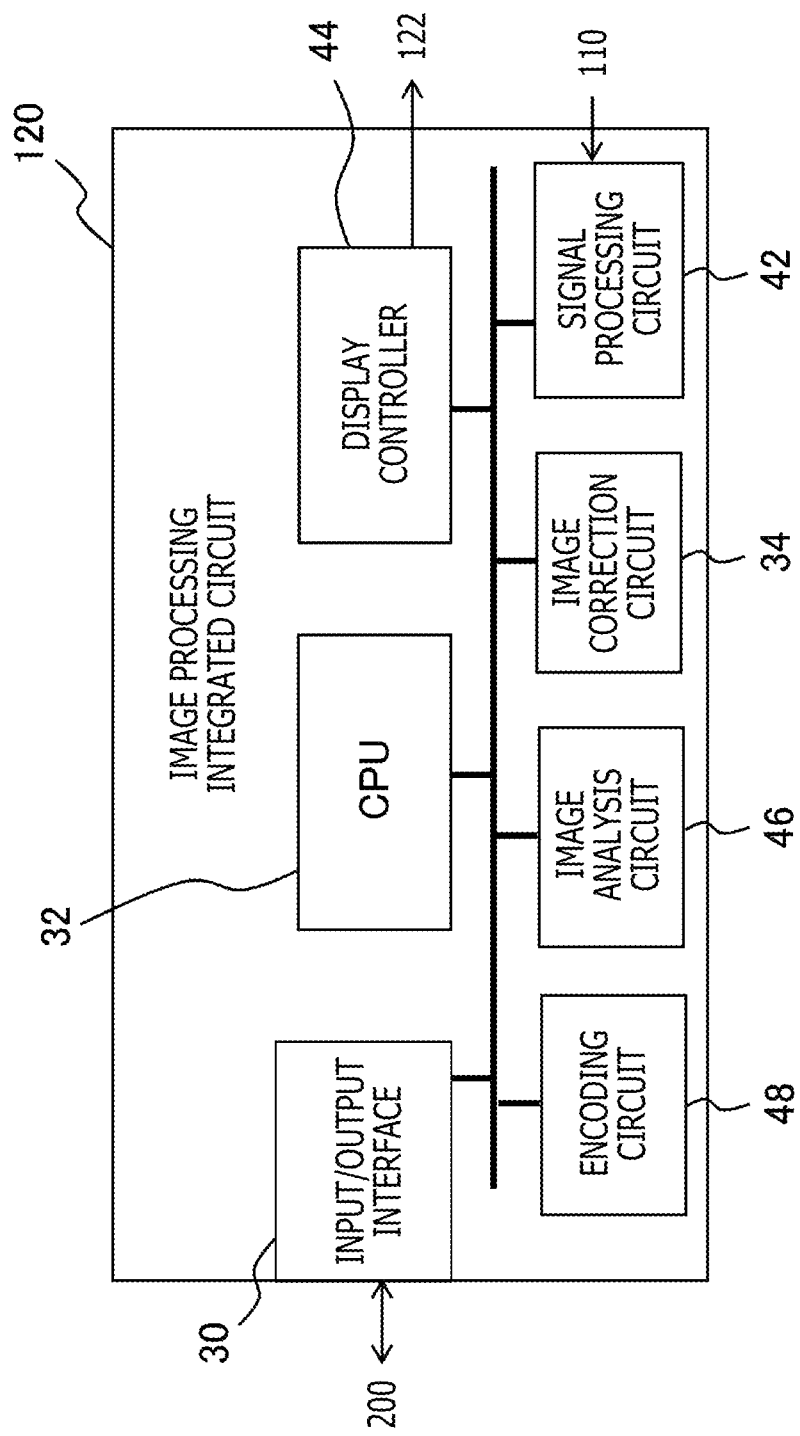
FIG. 8 is a view depicting a circuit configuration of an image processing integrated circuit of the present embodiment.

FIG. 8 depicts a circuit configuration of the image processing integrated circuit 120 in the present embodiment. However, FIG. 8 depicts only the configuration relating to the present embodiment but omits the other matters. The image processing integrated circuit 120 includes an input/output interface 30, a CPU 32, a signal processing circuit 42, an image correction circuit 34, an image analysis circuit 46, an encoding circuit 48, and a display controller 44.

The input/output interface 30 establishes communication with the content processing apparatus 200 by wired communication or wireless communication to implement transmission and reception of data. The CPU 32 is a main processor that processes signals such as an image signal and a sensor signal, commands, and data and outputs a result of the processes, and controls the other circuits. The signal processing circuit 42 acquires data of a captured image from the left and right image sensors of the stereo camera 110 and carries out suitable processes such as a demosaic process for the data.

The signal processing circuit 42 further performs pseudo binning for the data of the partially binned captured image to unify regions represented by one pixel over the entire image plane. In the following description, also the pseudo binning carried out by the signal processing circuit 42 is referred to merely as "binning." The signal processing circuit 42 supplies the data of the (partially binned) image for which the further binning is not performed to the image correction circuit 34 and supplies the data of the image for which the further binning is performed to at least one of the image analysis circuit 46 and the encoding circuit 48.

At this time, the signal processing circuit 42 supplies the data in an order of a pixel column in which pixel values are determined. However, depending upon a use of the captured image, the signal processing circuit 42 may suitably selectively determine a supplying destination of data. The image correction circuit 34 uses the data of the partially binned image to generate a display image of a predetermined resolution in which region areas represented by one pixel are made equal. To this end, the image correction circuit 34 retains, in the inside thereof, a displacement vector map in which displacement vectors representative of a displacement amount and a displacement direction of a pixel are represented on an image plane, the displacement vectors being to be used to correct a virtual image in which pixels after binning are arrayed uniformly to a display image.

Here, the "virtual image" is an image when it is assumed that regions represented by one pixel are all equal to regions of one pixel before binning. Then, the pixels of the partially binned image are displaced to determine a color at the positions, and they are suitably interpolated to determine all pixel values of the display image. The image correction circuit 34 determines pixel values of the display image in order from the top row and supplies the data to the display controller 44.

In order to send out data from the image correction circuit 34 to the display controller 44, actually a handshake controller not depicted or the like is used to control communication between them appropriately. The display controller 44 converts the sent out data successively into an electric signal to drive the pixels of the display panel 122 at appropriate timings to display an image. It is to be noted that the signal processing circuit 42 and the image correction circuit 34 may be provided for each of left and right images captured by the stereo camera 110.

The image analysis circuit 46 acquires predetermined information by analyzing an image that is binned over an entire region thereof. For example, the image analysis circuit 46 determines a distance to an imaging target by stereo matching using left and right captured images and generates a depth map in which the distance is represented as a pixel value on an image plane. The position or the posture of the head-mounted display may be acquired by SLAM. Further, it can be recognized by those skilled in the art that various contents are available as the substance of image analysis. The image analysis circuit 46 sequentially transmits the acquired information to the content processing apparatus 200 through the input/output interface 30.

The encoding circuit 48 compression-encodes data of an image, which is binned over an entire region thereof, in accordance with a predetermined method. The compression-encoded data is transmitted to the content processing apparatus 200 through the input/output interface 30. Alternatively, the compression-encoded data may be stored into an external storage device not detected or may be transmitted to an external apparatus through a network or the like. In a case where the compression-encoded data is transmitted to the content processing apparatus 200, the image may be analyzed by the content processing apparatus 200 side.

Figure 9:
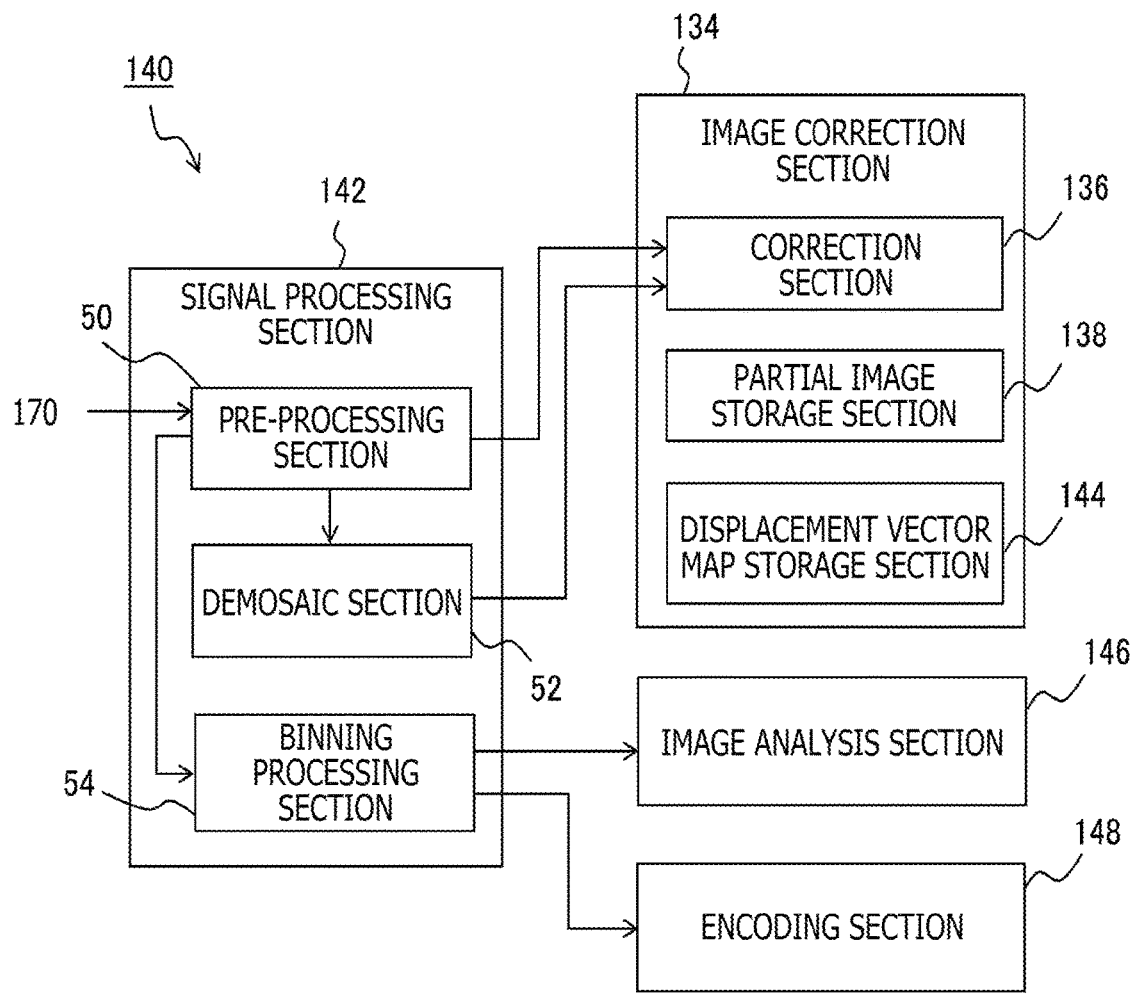
FIG. 9 is a view more particularly depicting a configuration principally of a signal processing circuit and an image correction circuit in the image processing integrated circuit.

FIG. 9 depicts a configuration of functional blocks of an image processing apparatus in the present embodiment. Referring to FIG. 9, an image processing apparatus 140 depicted is, for example, built in the head-mounted display 100 and has a circuit configuration equivalent to that of the image processing integrated circuit 120 depicted in FIG. 8. The image processing apparatus 140 includes a signal processing section 142, an image correction section 134, an image analysis section 146, and an encoding section 148.

The signal processing section 142 is implemented by the CPU 32 and the signal processing circuit 42 of FIG. 8 and includes a pre-processing section 50, a demosaic section 52, and a binning processing section 54. The pre-processing section 50 acquires data of a captured image outputted from the image sensor 170 and subjected to partial binning and carries out suitable pre-processes such as defect correction and noise removal processes for the data. The noise removal includes correction of the black level that is noise caused by dark current. The pre-processing section 50 starts processing without waiting that data of pixels for one frame of a captured image are outputted from the image sensor 170, and supplies data of a result of the processing to functional blocks at a succeeding stage. This applies similarly to the other functional blocks.

The demosaic section 52 performs a demosaic process for a captured image for which the pro-processes have been performed. In particular, the demosaic section 52 interpolates data in which each pixel has information of one color to generate data in which all pixels have information of three colors. Various methods have been proposed for interpolation, and the demosaic section 52 may adopt any of the methods. The demosaic section 52 supplies data of an image after the demosaicing to the image correction section 134. This image remains the image subjected to partial binning.

The binning processing section 54 acquires an image before the demosaic process from the pre-processing section 50 and further performs binning to unify the area and the aspect ratio of a region represented by one pixel over the entire image plane. In particular, to a pixel most reduced in the original captured image, another pixel is added to reduce the number of pixels. An image before demosaicing is used as a processing target, and binning is carried out by such a method same as the arithmetic operation method of the image sensor 170 as depicted in FIGS. 7A to 7C. This prevents such a situation that a delicate difference in the image appears between a region having been made a binning target by the image sensor 170 and a region for which binning has been performed later by the binning processing section 54 and a boundary between the regions becomes unnatural.

As described above, data of an image for which further binning is performed by the binning processing section 54 is supplied to the image analysis section 146 and the encoding section 148 as occasion demands. The image analysis section 146 is implemented by the CPU 32, the image analysis circuit 46, and the input/output interface 30 of FIG. 8, and carries out the image analysis described above for the image for which binning is performed over the entire region and then transfers a result of the image analysis to the content processing apparatus 200 or stores the result of the image analysis into a storage device.

Since the area and the aspect ratio of a region representing one pixel are unified over the entire region of the image, the shape of a figure becomes similar to an original one, and the image analysis section 146 can perform various kinds of image analysis with high accuracy. Data of a virtual object generated by the content processing apparatus 200 using a result of the analysis may be acquired by the head-mounted display 100 and synthesized with and displayed together with the captured image after correction generated by the image correction section 134.

Further, the area or the aspect ratio of a region for which binning is to be performed, namely, distribution of pixels whose charge is to be added and read out, may be designated by the image sensor 170 on the basis of a result of the image analysis carried out by the image analysis section 146. In this case, the image analysis section 146 includes an interface that transmits a designation signal to the image sensor 170. For example, the image analysis section 146 carries out an image recognition process and designates a region other than a figure of a predetermined object or a region spaced by more than a predetermined distance from the figure as a binning target.

As an alternative, the image analysis section 146 may designate a region within a predetermined range on an inner side of a peripheral edge in an image to be displayed on the head-mounted display 100 or a region spaced by a predetermined distance or more from a gazing point of the user as a binning target. Further, in a case where a camera including the image sensor 170 includes a fisheye lens having a high distortion rate, a region in which the lens distortion rate is lower than a predetermined value from within a captured image may be designated as a binning target. In a case where the camera includes a wide angle lens having a high distortion rate, a region in which the lens distortion rate is higher than a predetermined value from within a captured image may be designated as a binning target. As described above, even if the resolution in those regions is decreased, they are less likely to be recognized by the user.

It is to be noted that designation of a region other than a figure of a predetermined object, a region spaced by more than a predetermined distance from such figure, a region spaced by a predetermined distance from a gazing point of the user, a region in which the lens distortion rate when a fisheye lens is used is lower than a predetermined value, or a region in which the lens distortion rate when a wide angle lens is used is higher than a predetermine value can be applied not only to a head-mounted display but also to a system that includes a general flat panel type display. Further, only one of the designation rules described above may be applied, or otherwise two or more of the designation rules may be applied. Furthermore, the designation may be performed not by the image analysis section 146 of the image processing apparatus 140 but by the content processing apparatus 200, or may be set in advance in the control section 178 of the image sensor 170.

The encoding section 148 is implemented by the CPU 32, the encoding circuit 48, and the input/output interface 30 of FIG. 8, and compression-encodes an image subjected to binning over an entire region thereof and transfers the compression-encoded image to the content processing apparatus 200 or stores the compression-encoded image into a storage device. Also, the encoding section 148 can perform compression encoding without being influenced by binning irrespective of the method since the area and the aspect ratio of a region representing one pixel are unified over an entire region of the image. Further, since both the image analysis section 146 and the encoding section 148 need not determine an image having an excessively high resolution as a processing target, the load of processing of them can be suppressed.

The image correction section 134 is implemented by the CPU 32, the image correction circuit 34, and the display controller 44 of FIG. 8 and includes a correction section 136 that corrects a captured image subjected to partial binning to generate a display image, a partial image storage section 138 that temporarily stores data of an image, and a displacement vector map storage section 144 that stores a displacement vector map therein. The correction section 136 generates a display image by displacing each pixel of a virtual image represented by data of a captured image by an amount corresponding to a displacement vector indicated by the displacement vector map.

The target for setting a displacement vector in the displacement vector map may be all pixels of a virtual image plane or may be only discrete pixels at predetermined distances. In the latter case, the correction section 136 first determines a displacement destination in regard to pixels to which a displacement vector is set and determines a displacement destination of the remaining pixels by interpolation on the basis of the positional relations to the pixels. The correction section 136 may perform, in addition to the correction of increasing the resolution (pixel density) of a region subjected to binning, correction of providing distortion such that an image free from distortion is viewed when viewed through the eyepieces of the head-mounted display 100, chromatic aberration correction, correction for adjustment to the size of the display panel 122, and so forth simultaneously.

Also, in this case, a final displacement vector map is generated by determining in advance displacement vectors used for correction of the positions on the image plane and totaling the displacement vectors. In any case, the correction section 136 displaces the pixels by referring to the displacement vector map stored in the displacement vector map storage section 144. Then, a value of a pixel of the displacement source of the captured image before correction is read out to determine a pixel value of the displacement destination of the display image.

At this time, pixel values of a display image are derived by reading out values of a plurality of pixels existing within a predetermined range from a position of a reading out destination on the captured image and performing interpolation by bilinear interpolation, trilinear interpolation, or the like for the values. It is to be noted that the correction section 136 may acquire image data in which each pixel has information of one color before the demosaic process is performed from the pre-processing section 50. In this case, the correction section 136 may carry out the demosaic process simultaneously by reading out only pixels of a target color component in the captured image and performing interposition on the display image plane. In a case where chromatic aberration is to be corrected, the correction section 136 prepares a displacement vector map for each of the primary colors of red, green, and blue and refers to different maps for respective color components of the captured image.

The correction section 136 sequentially stores the pixel values determined in this manner into the partial image storage section 138. Then, when pixel values for one row are determined, in order from the top row, the data is outputted to the display panel 122. It is to be noted that the correction section 136 may not refer to any displacement vector map but directly calculate, upon correction, such a displacement amount and a displacement direction of a pixel as described above. Alternatively, the correction section 136 may displace predetermined pixels in the captured image by referring to the displacement vector map and determine a displacement destination for a pixel between the pixels by calculation.

Figure 10:
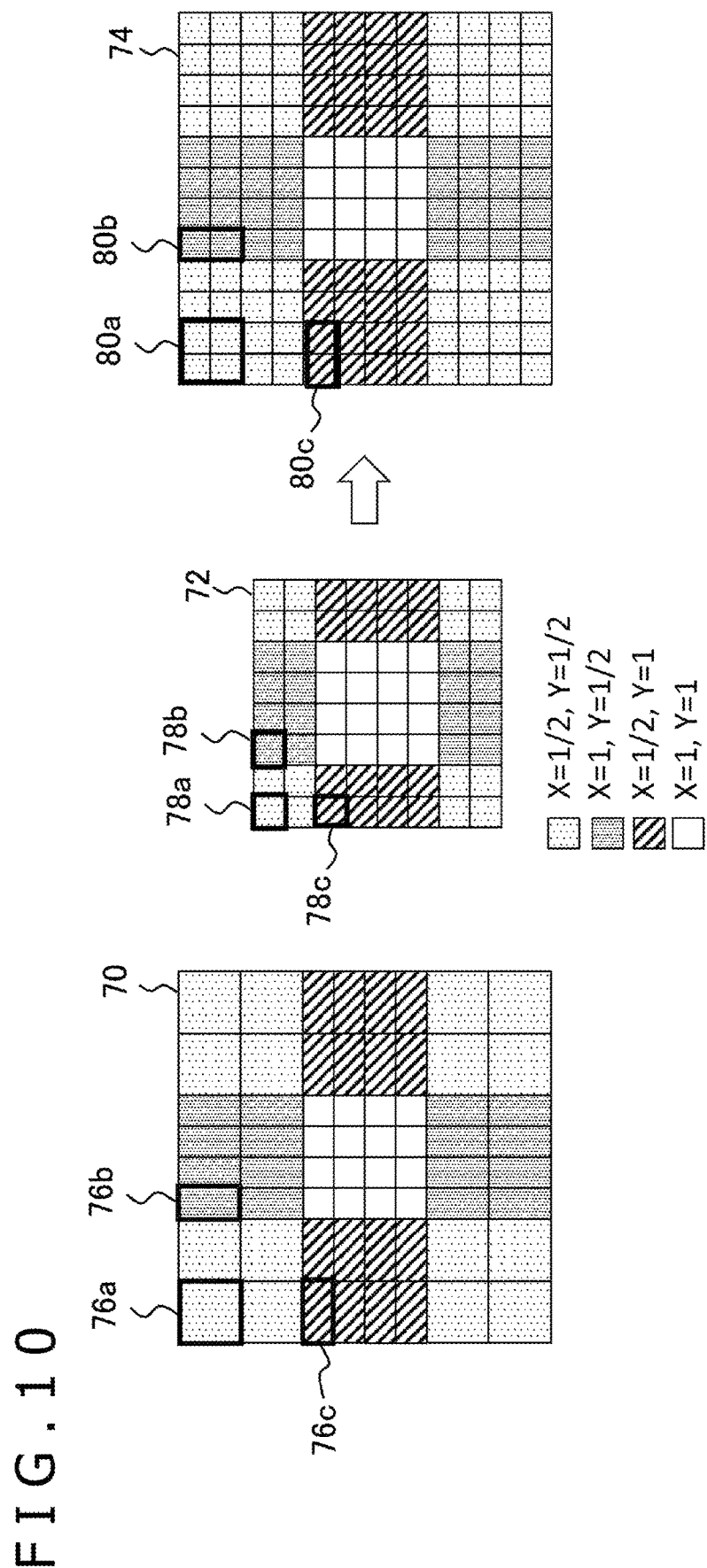
FIG. 10 is a view illustrating a relation between data of a captured image after partially binned and an image generated by a correction circuit in the present embodiment.

FIG. 10 is a view illustrating a relation between data of a captured image subjected to partial binning and an image generated by the correction section 136. As described above with reference to FIG. 5B, partial binning of the imaging plane makes the area or the aspect ratio of a region represented by one pixel various as indicated by an image plane 70. From the image sensor 170, data of a virtual image like an image plane 72 are outputted as described with reference to FIG. 5C.

Although, in the example depicted, the number of pixels in the image plane 70 before binning and also the number of imaging devices are 12×12, binning substantially changes the image such that it has 8×8 pixels. In the image, a figure is reduced in the region subjected to binning. Below the image plane 72, a magnification indicated by a fill pattern of each pixel is indicated where X indicates a magnification in the horizontal direction and Y indicates a magnification in the vertical direction. Regions 76a, 76b, and 76c in the image plane 70 correspond to pixels 78a, 78b, and 78c in the virtual image plane 72. The correction section 136 generates a display image having an image plane 74 from the virtual image plane 72.

In particular, in a region reduced to ½ in both of the horizontal and vertical directions, one pixel is extended to 2×2 pixels. In a region reduced to ½ in the vertical direction, one pixel is extended to 1×2 pixels. In a region reduced to ½ in the horizontal direction, one pixel is extended to 2×1 pixels. By this, the correction section 136 adjusts the area and the aspect ratio of the regions of all pixels to those of a minimum region represented by one pixel in the image plane 70. For example, regions 80a, 80b, and 80c are generated from the pixels 78a, 78b, and 78c in the virtual image plane 72, respectively.

As a result, the generated image plane 74 includes 12×12 pixels same as the number of pixels in the image sensor 170 before binning and same also as the number of imaging devices. The correction section 136 does not extend each pixel of the virtual image plane 72 independently to reflect the color of the original pixel but determines a color by determining a displacement destination of each pixel and performing interpolation as described hereinabove. Accordingly, in the image plane 74, a figure on the image plane 70 of the original captured image is represented in more detail than that in a binned state.

Figure 11:
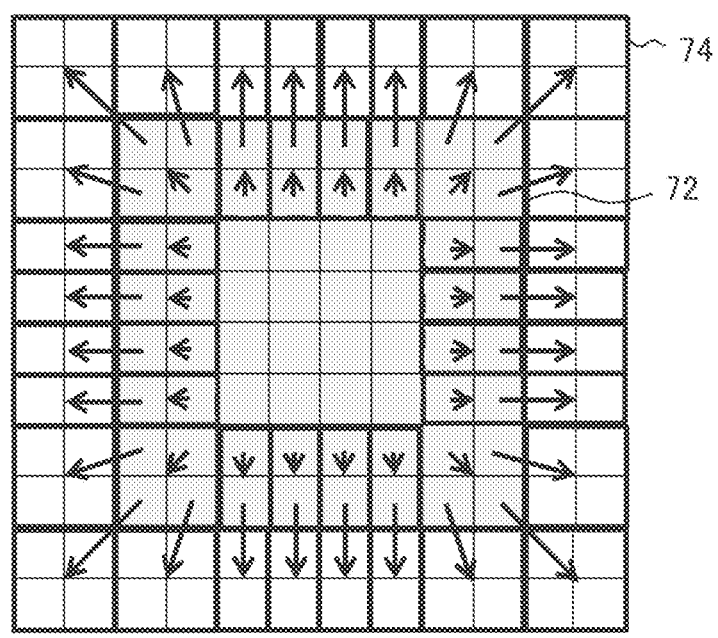
FIG. 11 is a view illustrating a method by the correction circuit for generating a display image on the basis of a displacement vector map.

FIG. 11 is a view illustrating a method by the correction section 136 for generating a display image using a displacement vector map. In FIG. 11, the virtual image plane 72 and the image plane 74 to be generated, which are depicted in FIG. 10, are represented in an overlapping relation. In this example, since central 4×4 pixels are not subjected to binning, the position of them does not change. In the other regions, the position changes between corresponding pixels as indicated by arrow marks. In FIG. 11, correspondence of the positions is indicated by an arrow mark that has a start point at the center of a pixel region of the image plane 72 and an end point at the center of a corresponding region of the image plane 74.

As depicted in FIG. 11, the arrow marks are determined in response to the number or array of pixels to be combined upon binning by the image sensor 170. The displacement vector map represents the displacement vectors represented by the arrow marks on the image plane. The correction section 136 refers to the displacement vector map to specify a displacement destination of a pixel to determine a color of the displacement destination on the image plane 74 and further interpolates such colors to determine all pixel values. Consequently, from data of a captured image outputted from the image sensor 170 and subjected to partial binning, an ordinary image having a resolution adjusted to that in a region that is not subjected to binning can be generated. In other words, the correction section 136 increases the number of pixels by interpolation after the pixels are displaced by the displacement vectors.

It is to be noted that, although FIG. 11 depicts a displacement vector having a start point at each pixel in regard to all pixels of the image plane 72, actually displacement vectors may be set discretely to pixels at predetermined distances as described hereinabove. In this case, the displacement destination of a pixel for which a displacement vector is not set may be determined by interpolating displacement destinations of pixels for which a displacement vector is set by linear interpolation, bilinear interpolation, trilinear interpolation, or the like.

Figure 12:
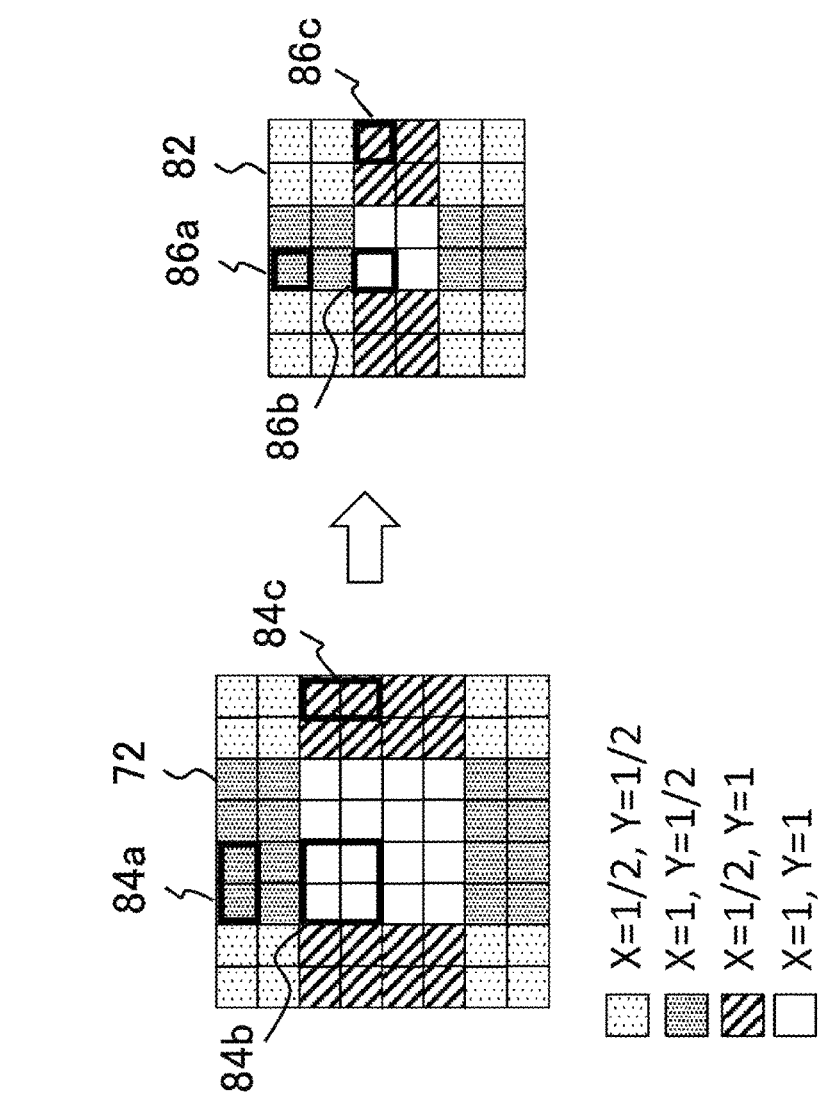
FIG. 12 is a view illustrating a relation between data of an image after partially binned and an image generated by a binning processing section in the present embodiment.

FIG. 12 is a view illustrating a relation between data of a partly binned image and an image generated by the binning processing section 54. The image planes 70 and 72 are planes of a captured image binned by the image sensor 170 and a virtual image indicated by output data from the image sensor 170, respectively, similarly to those depicted in FIG. 10. In the images, a figure is reduced in the binned regions.

The binning processing section 54 unifies the area or the aspect ratio of a region represented by one pixel on the image plane qualitatively by reducing other pixels in accordance with a most reduced pixel. In particular, the binning processing section 54 adjusts the area and the aspect ratio of the regions of all pixels to those of a maximum region represented by one pixel on the image plane 70. In this example, in accordance with a pixel that is reduced to ½ in both of the vertical and horizontal directions, in a region reduced to ½ only in the vertical direction, one pixel is reduced to ½ in the horizontal direction, and in a region reduced to ½ only in the horizontal direction, one pixel is reduced to ½ in the vertical direction. In a region that has not been a target of binning, one pixel is reduced to ½ in both of the vertical and horizontal directions.

For example, regions 84a, 84b, and 84c in the virtual image plane 72 are reduced and become pixels 86a, 86b, and 86c, respectively. However, since the binning processing section 54 carries out the process for data before demosaicing, actually the binning processing section 54 determines pixel values of the colors by arithmetic operation similar to that of the image sensor 170 as described hereinabove with reference to FIGS. 7A to 7C. In any case, this process can generate an image in which the image plane 70 of the original captured image is reduced on the whole. By determining this image as an analysis target or compression-encoding this image, processing in which the image is handled similarly to an ordinary image that is not in a partially reduced state becomes possible.

Figure 13:
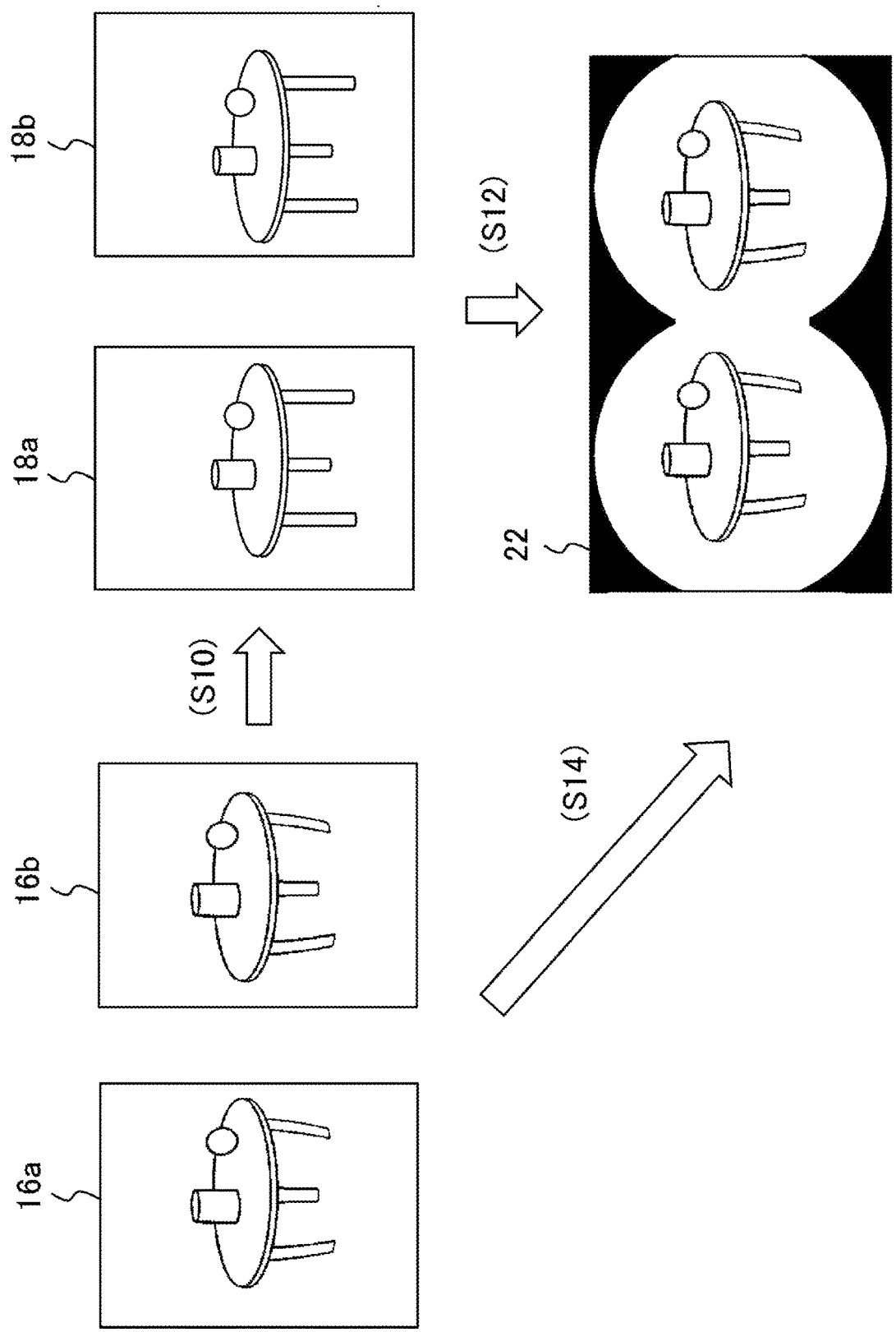
FIG. 13 is a view illustrating correction of lens distortion as an example of correction that is performed at the same time with extension of a binned pixel by the correction circuit in the present embodiment.

FIG. 13 is a view illustrating correction of lens distortion as an example of correction performed simultaneously with extension of a binned pixel by the correction section 136. It is assumed that, in an actual space, a table on which an article is placed exists in front of the user. The stereo camera 110 images the table to acquire a captured image 16a of a left visual point and a captured image 16b of a right visual point. Due to the parallax of the stereo camera 110, the captured images 16a and 16b indicate a displacement in a horizontal direction between positions of figures of the same imaging target.

Further, due to the lenses of the camera, distortion aberration occurs in the figures of the imaging target. Generally, such lens distortion (first distortion) is corrected to generate an image 18a of the left visual point and an image 18b of the right visual point that are free from distortion (S10). Here, if position coordinates (x, y) of a pixel in the original captured images 16a and 16b are corrected to position coordinates (x+Δx, y+Δy) in the images 18a and 18b after the correction, then a displacement vector (Δx, Δy) can be represented by the following general formula.

[Math. 1]

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_y) \quad \text{(formula 1)}$$

Here, r is a distance from an optical axis of a lens to a target pixel on an image plane, and $(c_x, c_y)$ is a position of the optical axis of the lens. Further, $k_1, k_2, k_3, \ldots$ are lens distortion coefficients and rely upon the design of the lens. An upper limit of the dimension number is not restricted specifically. It is to be noted that the formula to be used for correction of the lens distortion in the present embodiment is not restricted to the formula 1. In a case where an image is displayed on a flat panel display or image analysis is performed, a general image corrected in such a manner as described above is used. On the other hand, in order that the images 18a and 18b free from distortion are viewed on the head-mounted display 100 when they are viewed through the eyepieces, it may be necessary to provide distortion (second distortion) reverse to the distortion due to the eyepieces.

For example, in the case of a lens through which four sides of an image look recessed like a pincushion, an image is distorted to a barrel shape in advance. Accordingly, by distorting the images 18a and 18b free from distortion so as to correspond to the eyepieces and connecting them horizontally in accordance with the size of the display panel 122, a final display image 22 is generated (S12). The relation between figures of an imaging target in left and right regions of the display image 22 and figures of the imaging target in the images 18a and 18b free from distortion before the correction is equivalent to the relation between an image having lens distortion of the camera and an image in which the distortion is corrected.

Accordingly, based on an inverse vector of the displacement vector (Δx, Δy) in the formula 1, a figure having distortion in the display image 22 can be generated. However, naturally a variable relating to the lens is a value of the eyepieces. Accordingly, where a displacement component of a pixel by such removal and addition of distortion based on two lenses is included in a displacement vector, the display image 22 suitable for a display format of the head-mounted display 100 can be generated by single time processing from data of the partly binned image.

It can be considered that, in a case where the area or the aspect ratio of a region to be binned is changed dynamically during operation of the present system, timings of a vertical synchronizing signal and a horizontal synchronizing signal and an operating frequency of a pixel clock are dynamically changed. However, in order to dynamically change such timing controlling signals, it may be necessary to temporarily stop the image sensor and the signal processing circuit and perform re-setting. Therefore, it is difficult to perform continuous acquisition of a captured image.

Figure 14:
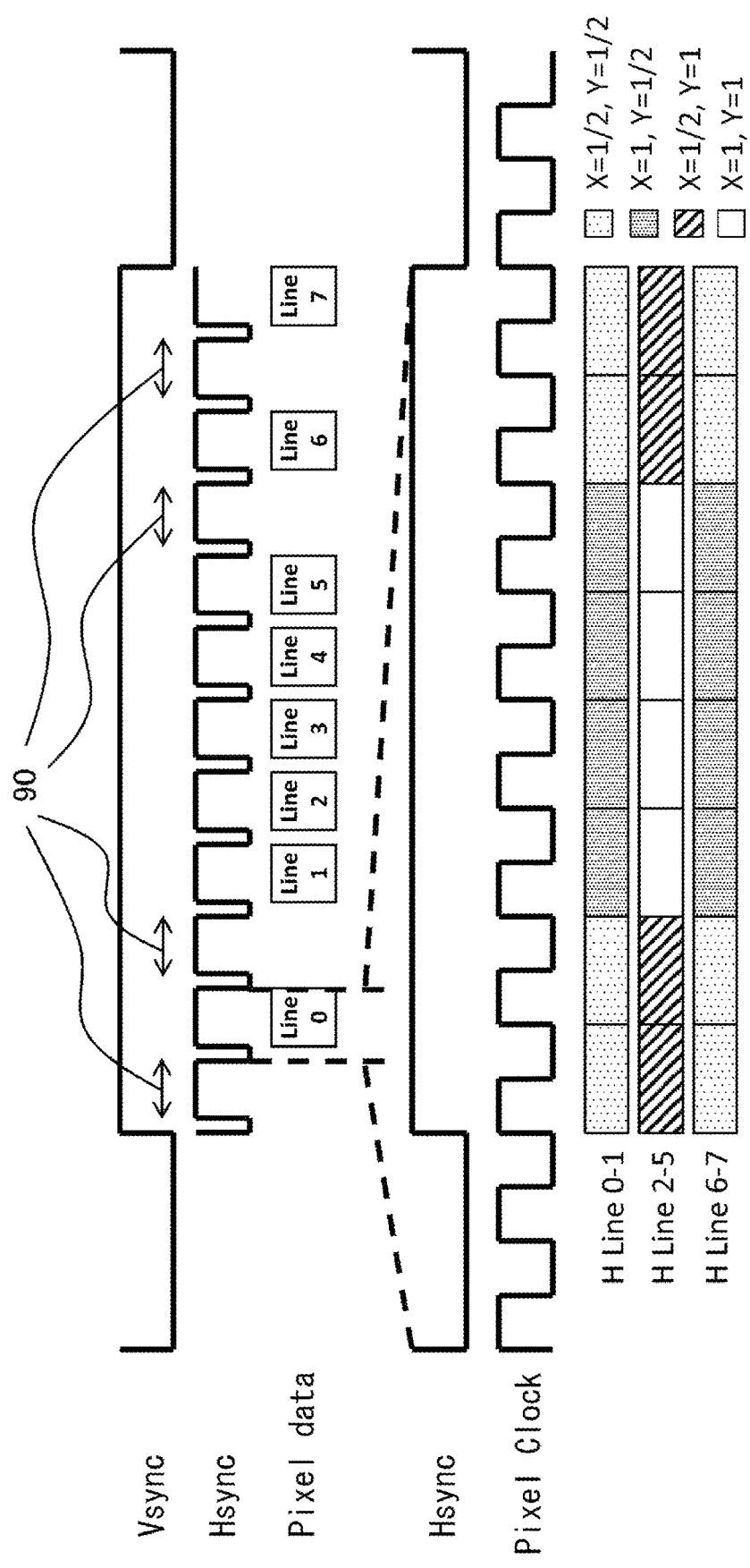
FIG. 14 is a view depicting an example of a timing chart when data of a partially binned captured image is acquired from the image sensor by a signal processing section.

FIG. 14 depicts an example of a timing chart when the signal processing section 142 acquires data of a partly binned captured image from the image sensor 170. This timing chart depicts an example in which, for simplified description, while the system is operating at a timing at which data of a captured image for one frame including 8×12 pixels is acquired, dynamic binning setting is performed and data of one frame including 8×8 pixels is acquired. The distribution of pixels for which binning is to be performed is similar to that of the image plane 70 of FIG. 10. An uppermost stage in FIG. 14 depicts a vertical synchronizing signal (Vsync) and a second stage indicates a horizontal synchronizing signal (Hsync). In this example, data of the first to eighth rows of the captured image are acquired during periods denoted by "Line0" to "Line7" within an active period of the horizontal synchronizing signal.

As depicted in an enlarged scale at a lower portion in FIG. 14, during an acquisition period for each row, data of pixels are acquired in order from a left end of the image plane in response to a pixel clock for eight pixels. In particular, in the first and second rows (H Lines 0 and 1), data for two pixels reduced to ½ in both of the vertical and horizontal directions, data for four pixels reduced to ½ only in the vertical direction, and data for two pixels reduced to ½ in both of the vertical and horizontal directions are acquired in this order. In the third to sixth rows (H Lines 2 to 5), data for two pixels reduced to ½ only in the horizontal direction, data for four pixels that are not binned, and data for two pixels reduced to ½ only in the horizontal direction are acquired in this order.

Further, in the seventh and eighth lines (H Lines 6 and 7), data for two pixels reduced to ½ in both of the vertical and horizontal directions, data for four pixels reduced to ½ only in the vertical direction, and data for two pixels reduced to ½ in both of the vertical and horizontal directions are acquired in this order. The number of pixels configuring one row and the number of rows configuring one frame are reduced by binning, and also it is possible to reduce the period of time used for data acquisition in both of the horizontal and vertical directions. In this example, while data for one row are successively acquired in response to respective pixel clocks, as to the horizontal synchronizing signal, a period 90 during which data is not acquired from within an active period is selectively provided in response to the number of rows of pixels of the captured image. By this, synchronism is maintained against variation of the number of pixels.

It is to be noted that the period 90 during which data is not acquired within an active period may be provided for the pixel clock. In particular, the number of cycles of pixel clocks per one period of the horizontal synchronizing signal is set to 12 and the system is operated in advance at a timing at which data of a captured image for one frame including 12×12 pixels is acquired such that, in the case where the dynamic binning setting is 8×8 pixels, the period 90 within which data is not acquired during an active period can be provided for a pixel clock.

By selectively providing the period 90, within which data is not acquired within an active period, in response to the number of rows and the number of columns of pixels of the captured image, the control section and the signal processing circuit of the image sensor can continue to transfer data of frames for which arbitrary binning is performed without temporarily stopping transfer of a captured image.

Figure 15:
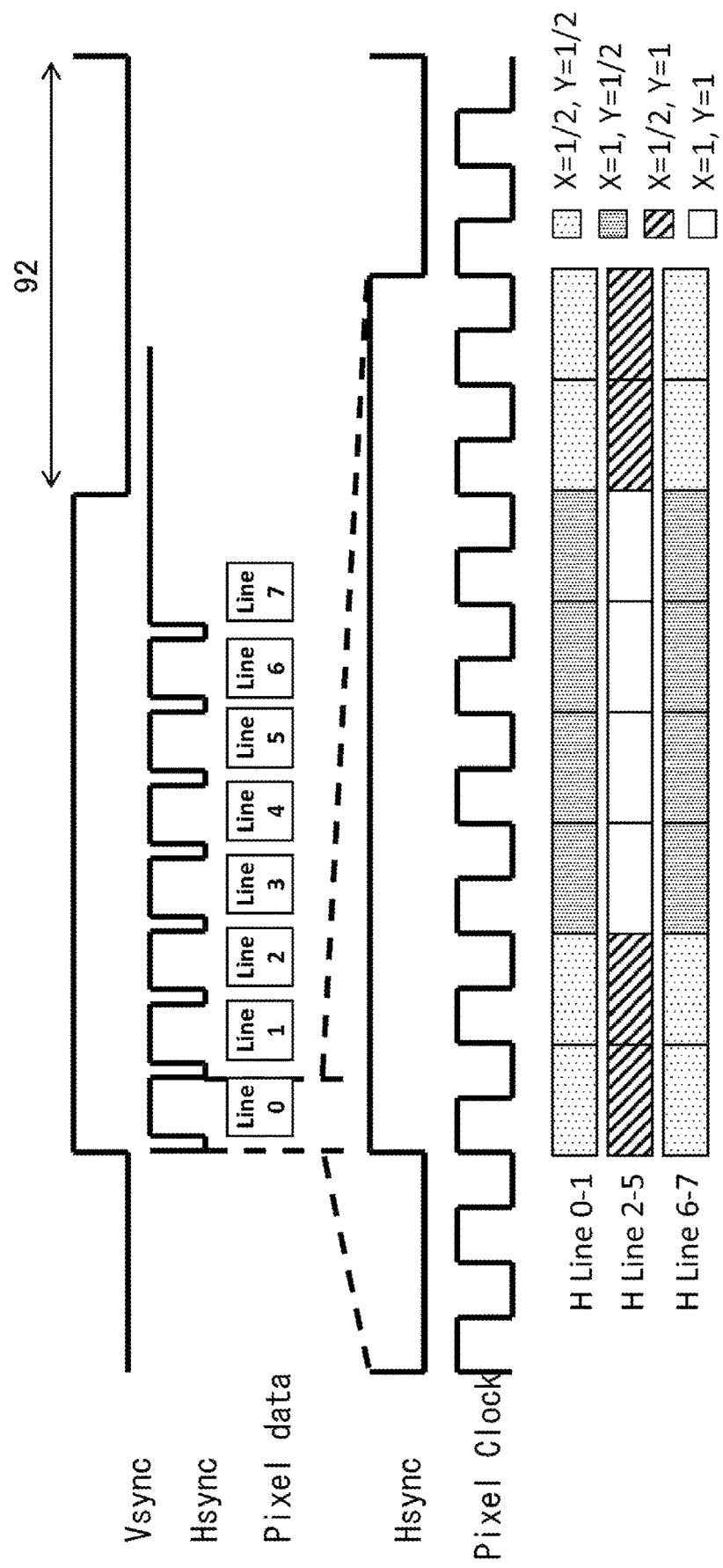
FIG. 15 is a view depicting another example of the timing chart when data of a partially binned captured image is acquired from the image sensor by the signal processing section.

FIG. 15 depicts another example of a timing chart when the signal processing section 142 acquires data of a partially binned captured image from the image sensor 170. The binning configuration of the image of the acquisition target and the manner of representation of the figure are same as those in FIG. 14. In this example, data for one row are successively acquired in response to respective pixel clocks similarly as in FIG. 14. Further, in this example, data of each row is acquired successively in response to the horizontal synchronizing signal. In this case, although the number of cycles of the horizontal synchronizing signal fluctuates on the basis of a dynamic binning designation, a vertical blanking period 92 is adjusted instead in response to the number of rows of the pixels of the captured image. Synchronism may be kept against decrease of pixels in this manner.

According to the present embodiment described above, in a technology for performing display or analysis through imaging, after a partial region of a captured image is binned and image data in which the resolution differs between different regions are acquired, the resolution is adjusted to the higher side or the lower side depending upon an intended use. In particular, when a display image to be viewed by a person is to be generated, the resolution is adjusted to the higher side. By excluding a central region of an image, which is likely to be gazed at, from a binning target, the size of data to be transmitted can be reduced and the power consumption can be suppressed while the visual influence upon picture quality is minimized.

When a captured image is to be analyzed or compression-encoded, the resolution is adjusted to the lower side. This can avoid waste by processing an image of an excessively high resolution and reduce the resource consumption amount. By providing a processing path for adjusting a partly binned captured image to the high resolution side and a processing path for adjusting the partly binned captured image to the low resolution side in this manner and switchably using them or using both of them depending upon an intended use, the resource consumption amount can be reduced while minimizing the influence on a result of various processes.

Further, a region for which binning is to be performed is determined on the basis of an analysis result of a captured image, visual characteristics of a person, characteristics of a lens provided in the camera, and so forth. Consequently, a region that can be less likely to be visually recognized by a user even if the resolution is decreased can be made a target of binning, and the effects described above can be achieved with the influence upon appearance minimized.

The present disclosure has been described in connection with the embodiment thereof. The embodiment is exemplary, and it is recognized by those skilled in the art that variable modifications are possible in regard to combinations of the components or the processes of the embodiment and that also such modifications fall within the scope of the present disclosure.

What is claimed is:

1. An image processing method executed by an image processing apparatus, comprising:
  determining, with circuitry, at least one area of an image to be captured for which a number of pixels can be reduced;
  designating, with the circuitry, a set of pixels of an image sensor, corresponding to the at least one area of the image, whose charge is to be added and read out as a value of one pixel, a resolution of the at least one area being reduced by addition of the charge of the set of pixels;
  capturing, with the circuitry, the image using the image sensor that includes the set of pixels designated;
  performing, with the circuitry, pre-processing on the image to correct defects in the image and to remove noise;
  performing, with the circuitry, a demosaic process on the image to impart each pixel of the image with information of three colors; and
  outputting the image,
  wherein
  the image processing method further comprises:
  performing a first binning mode on the image in a case that the image is to be displayed on a display panel, and
  performing a second binning mode on the image in a case that the image is to be compression encoded;
  in the first binning mode, the image is divided into a central region corresponding to a center of a viewing direction of a scene captured in the image, an upper region above the central region, a lower region below the central region, a left region to the left of the central region, a right region to the right of the central region, and corner regions; and
  the second binning mode adjusts a pixel density of the image to a most reduced region of the captured image.

2. The image processing method according to claim 1, wherein the first binning mode process returns a pixel density of a region of the image to an original pixel density of the image.

3. A non-transitory computer readable medium storing computer-readable instructions that, when executed by processing circuitry, cause the processing circuitry to perform a method comprising:
  determining at least one area of an image to be captured for which a number of pixels can be reduced;
  designating a set of pixels of an image sensor, corresponding to the at least one area of the image, whose charge is to be added and read out as a value of one pixel, a resolution of the at least one area being reduced by addition of the charge of the set of pixels;
  capturing the image using the image sensor that includes the set of pixels designated;
  performing pre-processing on the image to correct defects in the image and to remove noise;
  performing a demosaic process on the image to impart each pixel of the image with information of three colors; and
  outputting the image,
  wherein
  the method further comprises:
  performing a first binning mode on the image in a case that the image is to be displayed on a display panel, and
  performing a second binning mode on the image in a case that the image is to be compression encoded;
  in the first binning mode, the image is divided into a central region corresponding to a center of a viewing direction of a scene captured in the image, an upper region above the central region, a lower region below the central region, a left region to the left of the central region, a right region to the right of the central region, and corner regions; and
  the second binning mode adjusts a pixel density of the image to a most reduced region of the captured image to preserve an aspect ratio of the image.

4. An image processing device, comprising:
  circuitry configured to determine at least one area of an image to be captured for which a number of pixels can be reduced;

designate a set of pixels of an image sensor, corresponding to the at least one area of the image, whose charge is to be added and read out as a value of one pixel;

capture the image using the image sensor that includes the set of pixels designated;

perform pre-processing on the image to correct defects in the image and to remove noise;

perform a demosaic process on the image to impart each pixel of the image with information of three colors; and output the image, wherein the circuitry is further configured to:

perform a first binning mode on the image in a case that the image is to be displayed on a display panel, and perform a second binning mode on the image in a case that the image is to be compression encoded;

in the first binning mode, the image is divided into a central region corresponding to a center of a viewing direction of a scene captured in the image, an upper region above the central region, a lower region below the central region, a left region to the left of the central region, a right region to the right of the central region, and corner regions; and the second binning mode adjusts a pixel density of the image to a most reduced region of the captured image to preserve an aspect ratio of the image.

5. The image processing method according to claim 1, wherein in determining the at least one area of the image, the method further comprises:

determining a viewing direction of a scene captured in the image; and determine the at least one area of the image as an area outside a direct line of sight of the viewing direction.

6. The image processing method according to claim 1, wherein at least two of the upper region, the lower region, the left region, the right region, and the corner regions are binned differently.

7. The image processing method according to claim 6, wherein the corner regions are binned both in a horizontal and in a vertical direction.

8. The image processing method according to claim 6, wherein the upper and lower regions are binned in a vertical direction.

9. The image processing method according to claim 6, wherein the left and right regions are binned in a horizontal direction.

10. The image processing method according to claim 6, wherein the central region is not binned.

* * * * *